(12) United States Patent
Kuenzi

(10) Patent No.: US 12,159,497 B2
(45) Date of Patent: Dec. 3, 2024

(54) REMOTE PROGRAMMING FOR ACCESS CONTROL SYSTEM WITH VIRTUAL CARD DATA

(71) Applicant: Carrier Corporation, Jupiter, FL (US)

(72) Inventor: Adam Kuenzi, Silverton, OR (US)

(73) Assignee: CARRIER CORPORATION, Jupiter, FL (US)

(*) Notice: Subject to any disclaimer, the term of this patent is extended or adjusted under 35 U.S.C. 154(b) by 382 days.

(21) Appl. No.: 15/528,820

(22) PCT Filed: Dec. 1, 2015

(86) PCT No.: PCT/US2015/063153
§ 371 (c)(1),
(2) Date: May 23, 2017

(87) PCT Pub. No.: WO2016/089846
PCT Pub. Date: Jun. 9, 2016

(65) Prior Publication Data
US 2017/0311161 A1    Oct. 26, 2017

Related U.S. Application Data

(60) Provisional application No. 62/086,271, filed on Dec. 2, 2014.

(51) Int. Cl.
*G07C 9/00* (2020.01)
*G06F 21/45* (2013.01)
(Continued)

(52) U.S. Cl.
CPC ......... *G07C 9/00571* (2013.01); *G06F 21/45* (2013.01); *G07C 9/00904* (2013.01);
(Continued)

(58) Field of Classification Search
CPC .... H04W 12/06; H04W 12/08; H04L 9/3213; G06F 21/45; G07C 9/00904; G07C 9/00571; G07C 2009/00412
See application file for complete search history.

(56) References Cited

U.S. PATENT DOCUMENTS 6,717,528 B1   4/2004   Burleson et al.
6,989,732 B2   1/2006   Fisher
(Continued)

FOREIGN PATENT DOCUMENTS

AT    13608 U1    4/2014
CN    1842765 A   10/2006
(Continued)

OTHER PUBLICATIONS

Mexican Office Action dated Jan. 10, 2019 issued in corresponding Mexican Patent Application No. MX/a/2017/007294.
(Continued)

*Primary Examiner* — Michael Pyzocha
(74) *Attorney, Agent, or Firm* — Seager, Tufte & Wickhem, LLP

(57) ABSTRACT

An access control system includes a credential service operable to generate an encrypted programming credential. A mobile library on a mobile device operable to communicate with the credential service, the mobile library operable to receive the encrypted programming credential from the credential service and a credential module for an access
(Continued)

control, the credential module operable to extract programming data from the encrypted programming credential, the programming data usable to program the access control.

20 Claims, 7 Drawing Sheets

(51) Int. Cl.
*H04L 9/32* (2006.01)
*H04W 12/06* (2021.01)
*H04W 12/08* (2021.01)

(52) U.S. Cl.
CPC ......... *H04L 9/3213* (2013.01); *H04W 12/068* (2021.01); *H04W 12/08* (2013.01); *G07C 2009/00412* (2013.01)

(56) References Cited

U.S. PATENT DOCUMENTS

| | | | |
|---|---|---|---|
| 7,009,489 B2 | 3/2006 | Fisher | |
| 7,012,503 B2 | 3/2006 | Nielsen | |
| 7,315,823 B2 | 1/2008 | Brondrup | |
| 7,734,068 B2 | 6/2010 | Fisher | |
| 7,821,395 B2* | 10/2010 | Denison | G07C 9/00309 340/5.1 |
| 7,903,846 B2 | 3/2011 | Fisher | |
| 8,164,419 B2 | 4/2012 | Fisher | |
| 8,232,879 B2 | 7/2012 | Davis | |
| 8,427,320 B2 | 4/2013 | Davis | |
| 8,451,088 B2 | 5/2013 | Fisher | |
| 8,593,249 B2 | 11/2013 | Bliding et al. | |
| 8,643,475 B1 | 2/2014 | Kohno et al. | |
| 8,768,306 B1 | 7/2014 | Ben Ayed | |
| 8,792,936 B2 | 7/2014 | Rajendran et al. | |
| 8,912,884 B2 | 12/2014 | Fisher | |
| 9,053,629 B2 | 6/2015 | Fisher et al. | |
| 9,210,170 B1 | 12/2015 | Kim et al. | |
| 9,406,180 B2* | 8/2016 | Eberwine | H04L 63/10 |
| 9,600,949 B2 | 3/2017 | Conrad et al. | |
| 9,613,226 B2* | 4/2017 | Khassanov | H04L 63/0435 |
| 9,691,201 B2 | 6/2017 | Myers et al. | |
| 9,704,315 B2 | 7/2017 | Fisher et al. | |
| 9,713,002 B2 | 7/2017 | Roy et al. | |
| RE46,539 E | 9/2017 | Fisher | |
| 9,830,760 B2 | 11/2017 | Fisher | |
| 10,068,399 B2 | 9/2018 | Fisher et al. | |
| 10,395,452 B2 | 8/2019 | Morrison et al. | |
| 11,348,391 B2 | 5/2022 | Fisher et al. | |
| 2003/0093997 A1 | 5/2003 | Stalder et al. | |
| 2004/0025039 A1 | 2/2004 | Kuenzi et al. | |
| 2005/0071673 A1 | 3/2005 | Saito | |
| 2007/0025314 A1 | 2/2007 | Gerstenkorn | |
| 2007/0205861 A1 | 9/2007 | Nair et al. | |
| 2007/0296545 A1* | 12/2007 | Clare | G07C 9/00571 340/5.64 |
| 2008/0139116 A1 | 6/2008 | Balgard et al. | |
| 2009/0066476 A1* | 3/2009 | Raheman | G07C 9/00103 340/5.64 |
| 2009/0183541 A1* | 7/2009 | Sadighi | G07C 9/00309 70/320 |
| 2009/0256676 A1* | 10/2009 | Piccirillo | E05B 41/00 340/5.65 |
| 2010/0052931 A1 | 3/2010 | Kolpasky et al. | |
| 2010/0141381 A1* | 6/2010 | Bliding | G07C 9/00309 340/5.61 |
| 2010/0176919 A1 | 7/2010 | Myers et al. | |
| 2010/0201536 A1 | 8/2010 | Robertson et al. | |
| 2010/0283579 A1 | 11/2010 | Kraus et al. | |
| 2010/0297941 A1 | 11/2010 | Doan et al. | |
| 2011/0001603 A1 | 1/2011 | Willis | |
| 2011/0035604 A1* | 2/2011 | Habraken | G07F 7/1016 235/382 |
| 2011/0112969 A1* | 5/2011 | Zaid | H04W 12/50 701/2 |
| 2011/0311052 A1 | 12/2011 | Myers et al. | |
| 2012/0011366 A1* | 1/2012 | Denison | G07C 9/00571 707/812 |
| 2012/0060825 A1 | 3/2012 | Hensley et al. | |
| 2012/0092127 A1 | 4/2012 | Ganapathi et al. | |
| 2012/0129451 A1* | 5/2012 | Metivier | H04L 63/061 455/41.1 |
| 2012/0146918 A1 | 6/2012 | Kreiner et al. | |
| 2012/0154108 A1 | 6/2012 | Sugaya | |
| 2012/0154115 A1 | 6/2012 | Herrala | |
| 2012/0157080 A1* | 6/2012 | Metivier | G07C 9/00309 455/420 |
| 2012/0169461 A1 | 7/2012 | Dubois, Jr. | |
| 2012/0201381 A1 | 8/2012 | Miller et al. | |
| 2012/0213362 A1* | 8/2012 | Bliding | G07C 9/00817 340/5.61 |
| 2012/0230489 A1 | 9/2012 | Cho | |
| 2012/0234058 A1 | 9/2012 | Neil et al. | |
| 2012/0280783 A1* | 11/2012 | Gerhardt | G07C 9/00309 340/5.6 |
| 2012/0311642 A1 | 12/2012 | Ginn et al. | |
| 2013/0127593 A1* | 5/2013 | Kuenzi | G06F 21/33 340/5.61 |
| 2013/0176107 A1 | 7/2013 | Dumas et al. | |
| 2013/0200999 A1* | 8/2013 | Spodak | G05B 1/01 340/5.65 |
| 2013/0212661 A1* | 8/2013 | Neafsey | G06F 21/31 726/6 |
| 2013/0214898 A1 | 8/2013 | Pineau et al. | |
| 2013/0221094 A1 | 8/2013 | Smith et al. | |
| 2013/0257589 A1* | 10/2013 | Mohiuddin | G08C 17/02 340/5.61 |
| 2013/0268998 A1 | 10/2013 | Ko et al. | |
| 2013/0311373 A1 | 11/2013 | Han et al. | |
| 2013/0332367 A1 | 12/2013 | Quigley et al. | |
| 2013/0335193 A1* | 12/2013 | Hanson | H04W 12/06 340/5.61 |
| 2013/0342314 A1* | 12/2013 | Chen | G07C 9/00309 340/5.65 |
| 2014/0002236 A1 | 1/2014 | Pineau et al. | |
| 2014/0028348 A1 | 1/2014 | Andreev et al. | |
| 2014/0028438 A1* | 1/2014 | Kuenzi | G07C 9/00817 340/5.24 |
| 2014/0049361 A1 | 2/2014 | Ahearn et al. | |
| 2014/0049364 A1 | 2/2014 | Ahearn et al. | |
| 2014/0049370 A1* | 2/2014 | Eberwine | G07C 9/00174 340/5.61 |
| 2014/0051407 A1 | 2/2014 | Ahearn et al. | |
| 2014/0051425 A1* | 2/2014 | Ahearn | H04W 12/06 455/420 |
| 2014/0084059 A1 | 3/2014 | Siercho et al. | |
| 2014/0089178 A1 | 3/2014 | Lee et al. | |
| 2014/0109175 A1 | 4/2014 | Barton et al. | |
| 2014/0118107 A1* | 5/2014 | Almomani | G07C 9/00309 340/5.22 |
| 2014/0120905 A1* | 5/2014 | Kim | H04W 4/80 455/426.1 |
| 2014/0145823 A1 | 5/2014 | Aase | |
| 2014/0159660 A1 | 6/2014 | Klose et al. | |
| 2014/0181508 A1 | 6/2014 | Tanizawa et al. | |
| 2014/0181955 A1 | 6/2014 | Rosati | |
| 2014/0189880 A1 | 7/2014 | Funk | |
| 2014/0200064 A1 | 7/2014 | Okada et al. | |
| 2014/0219431 A1 | 8/2014 | Wagner et al. | |
| 2014/0219453 A1 | 8/2014 | Neafsey et al. | |
| 2014/0240087 A1 | 8/2014 | Liu et al. | |
| 2014/0267739 A1 | 9/2014 | Ibsies | |
| 2014/0277935 A1 | 9/2014 | Daman et al. | |
| 2014/0340195 A1* | 11/2014 | Polak | H03F 3/45071 340/5.61 |
| 2014/0373111 A1* | 12/2014 | Moss | H04W 12/08 726/5 |
| 2014/0375421 A1 | 12/2014 | Morrison et al. | |
| 2014/0376747 A1 | 12/2014 | Mullet et al. | |
| 2014/0380444 A1 | 12/2014 | Kelley | |

(56) References Cited

U.S. PATENT DOCUMENTS

| | | | |
|---|---|---|---|
| 2015/0004937 A1 | 1/2015 | Kremen et al. | |
| 2015/0035987 A1 | 2/2015 | Fernandez | |
| 2015/0048927 A1 | 2/2015 | Simmons | |
| 2015/0082033 A1* | 3/2015 | Bruce | H04L 63/08 713/168 |
| 2015/0170448 A1 | 6/2015 | Robfogel et al. | |
| 2015/0194000 A1* | 7/2015 | Schoenfelder | G07C 9/00309 340/5.61 |
| 2015/0199863 A1* | 7/2015 | Scoggins | G07C 9/00904 340/5.25 |
| 2015/0221152 A1* | 8/2015 | Andersen | G07C 9/00309 340/5.22 |
| 2015/0222517 A1* | 8/2015 | Mclaughlin | H04L 67/55 713/171 |
| 2015/0227923 A1 | 8/2015 | Kutsch et al. | |
| 2015/0227969 A1 | 8/2015 | Hanly | |
| 2015/0228134 A1 | 8/2015 | Tehranchi et al. | |
| 2015/0256973 A1 | 9/2015 | Raounak | |
| 2015/0269797 A1 | 9/2015 | Kauffmann et al. | |
| 2015/0279132 A1 | 10/2015 | Perotti | |
| 2015/0350913 A1* | 12/2015 | Eberwine | G06Q 20/3821 455/411 |
| 2016/0014131 A1* | 1/2016 | Neafsey | H04L 63/061 713/171 |
| 2016/0035159 A1 | 2/2016 | Ganapathy Achari et al. | |
| 2016/0035163 A1* | 2/2016 | Conrad | G07C 9/00309 340/5.61 |
| 2016/0036788 A1* | 2/2016 | Conrad | G07C 9/00571 713/168 |
| 2016/0036814 A1* | 2/2016 | Conrad | H04L 63/0876 713/171 |
| 2016/0049024 A1 | 2/2016 | Johnson et al. | |
| 2016/0055692 A1 | 2/2016 | Trani | |
| 2016/0055698 A1 | 2/2016 | Gudmundsson et al. | |
| 2016/0080390 A1 | 3/2016 | Kalb et al. | |
| 2016/0155281 A1 | 6/2016 | O'Toole et al. | |
| 2016/0217634 A1* | 7/2016 | Ferry | H04W 12/041 |
| 2016/0358397 A1* | 12/2016 | Kristensen | G07C 9/00309 |
| 2016/0368455 A1* | 12/2016 | Kim | B60R 25/23 |
| 2016/0371907 A1* | 12/2016 | Ma | E05B 81/80 |
| 2017/0154484 A1* | 6/2017 | Plüss | H04W 4/80 |
| 2017/0255768 A1 | 9/2017 | Goh et al. | |
| 2017/0265026 A1* | 9/2017 | Ahearn | H04W 4/80 |
| 2018/0047233 A1 | 2/2018 | Fisher | |
| 2018/0114387 A1* | 4/2018 | Klink | H04W 12/068 |
| 2019/0051074 A1* | 2/2019 | Ufkes | H04W 4/80 |
| 2019/0122472 A1* | 4/2019 | Johnson | G07C 9/00857 |
| 2019/0371096 A1 | 12/2019 | Fisher | |
| 2020/0312072 A1* | 10/2020 | Myers | G07C 9/00857 |
| 2021/0351920 A1* | 11/2021 | Tang | H04L 9/0825 |
| 2023/0032659 A1 | 2/2023 | Roy et al. | |

FOREIGN PATENT DOCUMENTS

| | | |
|---|---|---|
| CN | 103021054 A | 4/2013 |
| CN | 103026682 A | 4/2013 |
| CN | 103093531 A | 5/2013 |
| CN | 203361799 U | 12/2013 |
| CN | 103729925 A | 4/2014 |
| CN | 104063930 A | 9/2014 |
| CN | 104200555 A | 12/2014 |
| EP | 2085934 A1 | 8/2009 |
| EP | 2192560 A1 | 6/2010 |
| EP | 2 620 919 A1 | 7/2013 |
| EP | 2701124 A1 | 2/2014 |
| MX | 2017001090 A | 7/2017 |
| WO | 2006136662 A1 | 12/2006 |
| WO | 2012014143 A2 | 2/2012 |
| WO | 2013/074301 A1 | 5/2013 |
| WO | 2014031399 A1 | 2/2014 |
| WO | 2014044832 A1 | 3/2014 |
| WO | 2016019064 A1 | 2/2016 |

OTHER PUBLICATIONS

Mexican Office Action dated Jan. 10, 2019 issued in corresponding Mexican Patent Application No. MX/a/2017/007292.
U.S. Office Action dated Feb. 25, 2019 issued in corresponding U.S. Appl. No. 15/528,887.
International search report for Application No. PCT/US2015/063153 dated Feb. 18, 2016.
Chinese Office Action dated Mar. 29, 2019 for corresponding Chinese Patent Application 201580066030.5.
Chinese Office Action dated Mar. 29, 2019 for corresponding Chinese Patent Application 201580065881.8.
Chinese Office Action dated Mar. 21, 2019 for corresponding Chinese Patent Application 201580065827.3.
Mexican Office Action dated Oct. 17, 2019 issued for corresponding Mexican Patent Application No. MX/a/2017/007292.
European Office Action dated Nov. 22, 2019 issued for corresponding European Patent Application No. 15816969.8.
Chinese Office Action dated Nov. 4, 2019 issued for Chinese Patent Application No. 201580065827.3.
US Non-Final Office Action dated Oct. 11, 2019 for corresponding U.S. Appl. No. 15/528,896.
European Office Action dated Oct. 28, 2019 for corresponding European Patent Application No. 15816966.4.
Chinese Office action dated May 24, 2021 issued for corresponding Chinese Patent Application No. 201580065872.9.
Chinese Office Action dated Mar. 4, 2020 issued for Chinese Patent Application No. 201580065872.9.
EP Search Report dated Sep. 2, 2022 issued for corresponding European Patent Application No. 22171026.2.
U.S. Non-Final Office Action dated Jul. 27, 2022 for U.S. Appl. No. 17/325,640.
European Office action dated Nov. 9, 2020 issued for corresponding European Patent Application No. 15816966.4.
Tim Andersson; "Institutionen for datavetenskap Bluetooth Low Energy and Smartphones for Proximity-Based Automatic Door Locks", Jun. 8, 2014, XP055744496, URL:https:/www.diva-portal.org/smash/get/diva2:723899/FULLTEXT01.pdf.
Woolaston, "The end of the house key? Mobile app lets you open your front door using your Phone (and you don't even need to take it out of your pocket)", http.//www.dailymail.co.uk/sciencetech/article-2384817/Kwikset-Kevo-mobile-app-lets-open-door-using-PHONE.html; August 5, 3 p. 2013.
"Sesame Smart Lock", http://www.candyhouse.co/. 8 pages, Accessed Oct. 21, 2015.
Usher Mobile Identity Platform. MicroStrategy. 24 pages. https://www.microstrategy.com/Strategy/media/downloads/products/usher_overview-presentation.pdfpresentation.pdf. Accessed Feb. 5, 2015.
Sentrilock Sentrikey® Iphone Mobile App Guide, 2024. https://www.sentrilock.com/sentrikey-real-estate-ios-mobile-app/.
Sentrilock, Let's Unlock the Possibilities, Electronic Lockboxes Sales Brochure, 2024. https://www.sentrilock.com/.
Sentrilock Sues Competitor, Alleging Patent Infringement, National Association of Realtors® 3 pages, Feb. 16, 2022. Accessed Mar. 14, 2024.
Sentrilock, Your Secure Lockbox Solution, The Secure, Safe and Easy-to-Use Lockbox, 1 page, May 2019.
International Search Report for Corresponding Application No. EP14173062 dated Dec. 5, 2014.
MicroStrategy, "Secure Business Intelligence on Apple(R) Mobile Devices," Microstrategy Incorporated, 20 pages. COLL-0967 0511. 2011.
Usher, "Safe and Secure Mobile Identity Network," Microstrategy Incorporated, 2013 2 pages. COLL-1085, 1012.
https://www.merriam-webster.com/dictionary/track. Apr. 17, 2017, 2 pages.
https://youtube/D1L3088GKew, "Lockitron-Keyless Entry Using Your Phone", Lockitron, Oct. 2, 2012.

* cited by examiner

REMOTE PROGRAMMING FOR ACCESS CONTROL SYSTEM WITH VIRTUAL CARD DATA

CROSS-REFERENCE TO RELATED APPLICATION

Benefit is claimed of U.S. Provisional Patent Application No. 62/086,271, filed Dec. 2, 2014, and entitled "Remote Programming For Access Control System With Virtual Card Data", the disclosure of which is incorporated by reference herein in its entirety as if set forth at length.

BACKGROUND

The present disclosure relates generally to access control systems, and more particularly, to a system and a method of remote programming an access control.

An access control system is typically operated by encoding data on a physical key card that indicates access rights. Some access control systems are online where the reader can use some means to communicate with the access control system. In online systems the access rights are usually a reference identifier. Other access control systems are offline and the access rights are encoded as data that can be decoded and interpreted by the offline lock to retrieve the access rights. An example is a hotel locking system where a front desk encodes a guest card and an offline, battery powered lock on a guest room door has the means to decode the key card and permit or deny access based on the encoded access rights. Some methods of encoding access rights include sequencing where subsequent access rights have a sequence number that is greater than the prior access rights.

Some access control systems have utilized a device other than a physical key card to communicate with a lock, such as via audio tones from a mobile device, where there is also a separate method of indicating access rights that is different from the data on the key card. Such systems are partially effective in that a person can open the lock by either means. But because of the separate means for indicating access rights where the lock can not determine which access right was sequenced before the other access right, these systems do not allow use of the ubiquitous physical key card in conjunction with the mobile device. The advantage of using the virtual card data is that no synchronization is required between separate systems for indicating access rights, and the lock can have a unified audit trail.

Conventional hotel locking systems utilize encryption, i.e., AES, RSA, ECC, etc., to perform cryptographic operations to validate digital certificates and encrypt/decrypt/validate data in these certificates. The encryption may be used to authenticate physical cards or virtual cards passed over Near Field Communications (NFC) or Bluetooth to the lock. Locks require encryption keys to be programmed before entry into service or are occasionally changed as part of normal encryption key management. Management of these encryption keys and configuration of locks requires a programming device and programming operation to configure the locks and encryption keys that are specific to the hotel property or specific to the lock that is being put into service. Another conventional cryptographic operation, is to preload encryption keys in the factory and pre-configure the lock for the property before being put into service.

SUMMARY

An access control system according to one disclosed non-limiting embodiment of the present disclosure includes a credential service operable to generate an encrypted programming credential; an installer mobile application on a mobile device operable to communicate with the credential service, the installer mobile application operable to receive the encrypted programming credential from the credential service; and a credential module for an access control, the credential module operable to extract programming data from the encrypted programming credential, the programming data usable to program the access control.

A further embodiment of the present disclosure includes, wherein the credential module is operable to decrypt and validate the encrypted programming credential.

A further embodiment of any of the foregoing embodiments of the present disclosure includes, wherein the programming data is operable to set a lock encryption key.

A further embodiment of any of the foregoing embodiments of the present disclosure includes, wherein the programming data is operable to roll a lock encryption key.

A further embodiment of any of the foregoing embodiments of the present disclosure includes, further comprising decrypting and extracting the programming data.

A further embodiment of any of the foregoing embodiments of the present disclosure includes, wherein the programming data is identical to a card meta-data physically encoded on a physical key card.

A further embodiment of any of the foregoing embodiments of the present disclosure includes, wherein the mobile device includes a smartphone.

A further embodiment of any of the foregoing embodiments of the present disclosure includes, wherein the access control is a lock.

A further embodiment of any of the foregoing embodiments of the present disclosure includes, wherein the mobile device includes a mobile application used by hotel maintenance.

A further embodiment of any of the foregoing embodiments of the present disclosure includes, wherein the access control is a lock.

A further embodiment of any of the foregoing embodiments of the present disclosure includes, wherein the mobile device includes a key card.

A further embodiment of any of the foregoing embodiments of the present disclosure includes, wherein the access control is a lock.

A method of managing encryption for a mobile device, the method according to another disclosed non-limiting embodiment of the present disclosure includes downloading an encrypted programming credential to a mobile device; communicating the encrypted programming credential to a credential module in an access control; decrypting and validating the encrypted programming credential; extracting the programming data from the encrypted programming credential; and communicating the programming data from the credential module to program the access control.

A further embodiment of any of the foregoing embodiments of the present disclosure includes setting a lock encryption key in response to the programming data.

A further embodiment of any of the foregoing embodiments of the present disclosure includes rolling a lock encryption key in response to the programming data.

A further embodiment of any of the foregoing embodiments of the present disclosure includes, wherein downloading the encrypted programming credential to the mobile device includes downloading the encrypted programming credential to a smart phone.

A further embodiment of any of the foregoing embodiments of the present disclosure includes, wherein downloading the encrypted programming credential to the mobile device includes downloading the encrypted programming credential to a key card.

A method of managing credentials for a mobile device, the method according to another disclosed non-limiting embodiment of the present disclosure includes downloading an encrypted programming credential and an encrypted mobile credential to a mobile device; communicating the encrypted programming credential to a credential module in an access control; decrypting and validating the encrypted programming credential; extracting the programming data from the encrypted programming credential; communicating the programming data from the credential module to program the access control; communicating the encrypted mobile credential to the credential module in an access control subsequent to communicating the programming data from the credential module to program the access control; decrypting and validating the encrypted mobile credential; extracting the virtual card data from the encrypted mobile credential; and communicating the virtual card data from the credential module to operate the access control as a "virtual card read."

A further embodiment of any of the foregoing embodiments of the present disclosure includes setting a lock encryption key in response to the programming data.

A further embodiment of any of the foregoing embodiments of the present disclosure includes rolling a lock encryption key in response to the programming data.

A further embodiment of any of the foregoing embodiments of the present disclosure includes, wherein the encrypted mobile credential includes an access category in addition to a mobile credential with the virtual card data for a specific access control.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
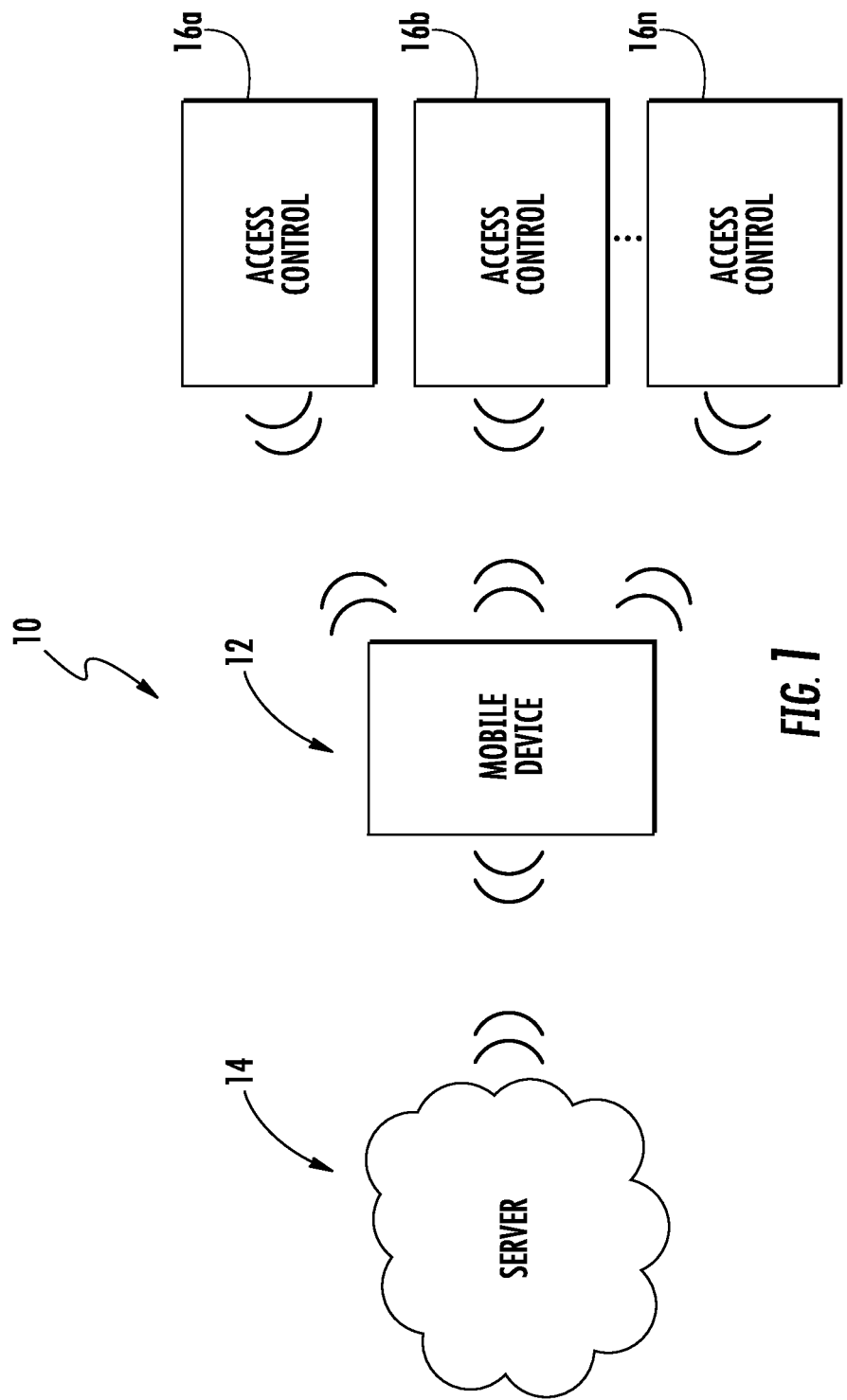
FIG. 1 is a general schematic system diagram of a user authentication system.

FIG. 1 schematically illustrates an access control system 10. The system 10 generally includes a mobile device 12, a server 14, and a plurality of access controls 16, schematically illustrated as 16a, 16b, . . . , 16n. It should be appreciated that, although particular systems are separately defined in the schematic block diagrams, each or any of the systems may be otherwise combined or separated via hardware and/or software.

The mobile device 12 is a wireless capable handheld device such as a smartphone, that is operable to communicate with the server 14 and the access controls 16. The server 14 may provide credentials and other data to the mobile device 12, such as firmware or software updates to be communicated to one or more of the access controls 16. Although the server 14 is depicted herein as a single device, it should be appreciated that the server 14 may alternatively be embodied as a multiplicity of systems, from which the mobile device 12 receives credentials and other data.

Each access control 16 is a wireless-capable, restricted-access, or restricted-use device such as wireless locks, access control readers for building entry, electronic banking controls, data transfer devices, key dispenser devices, tool dispensing devices, and other restricted-use machines. The mobile device 12 submits credentials to the access controls 16, thereby selectively permitting a user to access or activate functions of the access controls 16. A user may, for example, submit a credential to an electromechanical lock to unlock it, and thereby gain access to a restricted area. In another example, a user may submit a credential to an electronic banking control to withdraw funds. In still another example, the user may submit the credential to a unit that dispenses key cards with data associated with or data retrieved from the credential. A mobile device 12 may store credentials for one or all or other of the examples noted above, and in addition may store a plurality of credentials for each type of application at the same time. Some credentials may be used for multiple access controls 16. For example, a plurality of electronic locks in a facility may respond to the same credential. Other credentials may be specific to a single access control 16.

Figure 2:
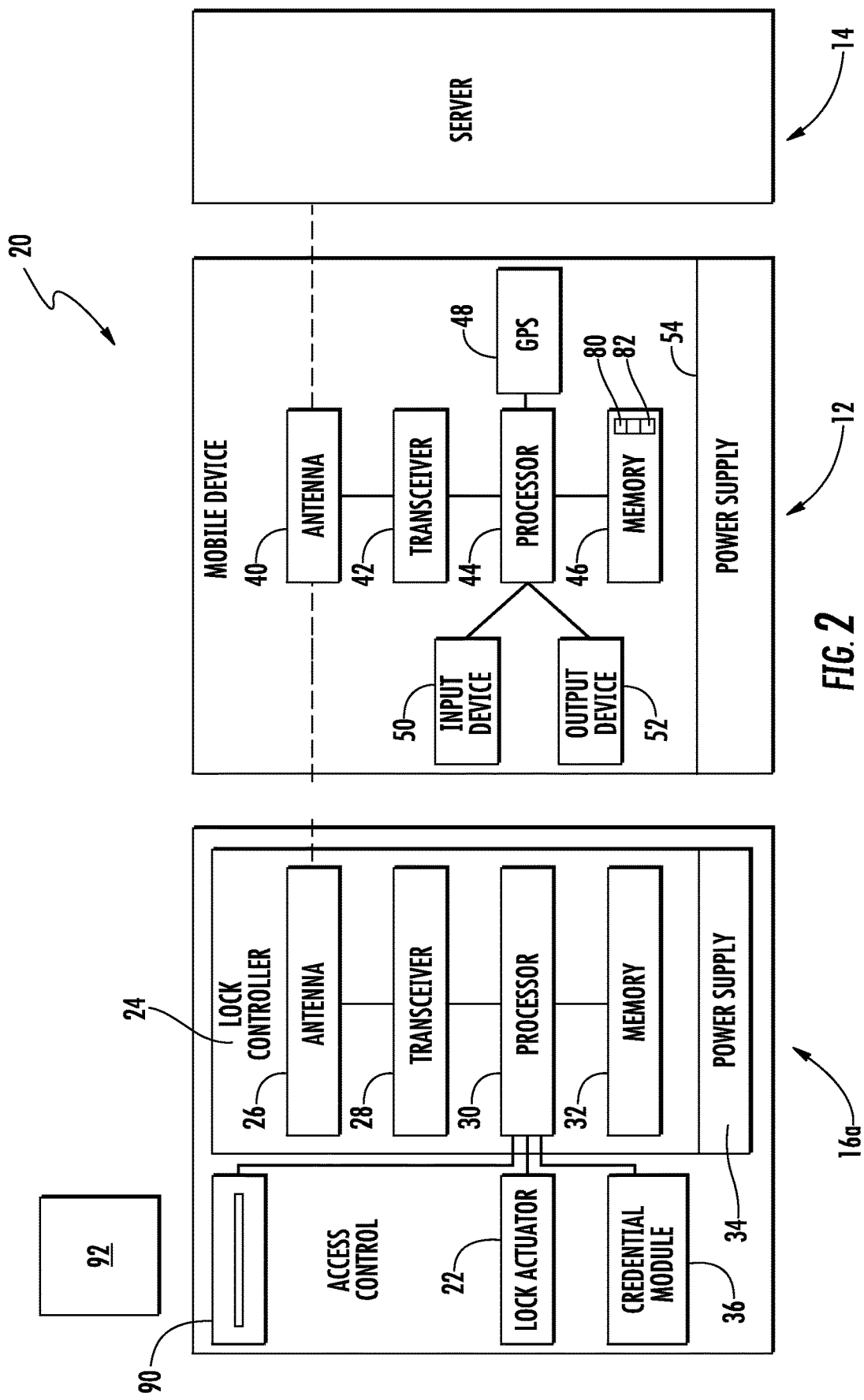
FIG. 2 is a block diagram of the user authentication system.

With reference to FIG. 2, a block diagram of an example electronic lock system 20 includes the access control 16a, the mobile device 12, and the server 14. The access control 16a generally includes a lock actuator 22, a lock controller 24, a lock antenna 26, a lock transceiver 28, a lock processor 30, a lock memory 32, a lock power supply 34, a lock card reader 90 and a credential module 36. The access control 16a is responsive to credentials from the mobile device 12, and may, for example, be the lock of a lockbox, a door lock, or a lock core. Although the present disclosure focuses primarily on credentials for access control, it should be appreciated that other systems wherein credentials are transmitted from a mobile device to an access control so as to identify the user to an online system or validate user access rights or permissions in an offline system will benefit herefrom. Such systems include virtual or electronic banking systems, machine operation systems, dispensing systems, and data access systems.

Upon receiving and authenticating an appropriate credential from the mobile device 12 using the credential module 36, or after receiving card data from lock card reader 90, the lock controller 24 commands the lock actuator 22 to lock or unlock a mechanical or electronic lock. The lock controller 24 and the lock actuator 22 may be parts of a single electronic or electromechanical lock unit, or may be components sold or installed separately.

The lock transceiver 28 is capable of transmitting and receiving data to and from at least the mobile device 12. The lock transceiver 28 may, for instance, be a near field communication (NFC), Bluetooth, or Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate card data and determine the access rights contained in the card data or to pass messages from a transceiver to a credential module 36 and to receive a response indication back from the credential module 36 with card data. The lock memory 32 may be RAM, EEPROM, or other storage medium where the lock processor 30 can read and write data including but not limited to lock configuration options and the lock audit trail. The lock audit trail may be a unified audit trail that includes events initiated by accessing the lock via the lock card reader 90 or the mobile device 12. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

The credential module 36 is in communication with the lock processor 30 and is operable to decrypt and validate a credential to extract virtual card data communicated into the lock controller 24 as a "virtual card read." That is, the access control 16a has essentially two readers, one reader 90 to read a physical key card 92 and the credential module 36 to communicate with the mobile device 12 via the lock processor 30 and the transceiver 28 and antenna 26.

While the figure shows the lock antenna 26 and the transceiver 28 connected to the processor 30, this is not to limit other embodiments that may have additional antenna 26 and transceiver 28 connected to the credential module 36 directly. The credential module 36 may contain a transceiver 28 and antenna 26 as part of the credential module. Or the credential module 36 may have a transceiver 28 and antenna 26 separately from the processor 30 which also has a separate transceiver 28 and antenna 26 of the same type or different. In some embodiments, the processor 30 may route communication received via transceiver 28 to the credential module 36. In other embodiments the credential module may communicate directly to the mobile device 12 through the transceiver 28.

The mobile device 12 generally includes a key antenna 40, a key transceiver 42, a key processor 44, a key memory 46, a GPS receiver 48, an input device 50, an output device 52, and a key power supply 54. The key transceiver 42 is a transceiver of a type corresponding to the lock transceiver 28, and the key antenna 40 is a corresponding antenna. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12. In other embodiments, the mobile device 12 communicates with the server 14 at the same time as it communicates to the access control 16a. This is the online configuration and in this embodiment a mobile credential is retrieved in real time and is passed to the credential module 36 without storing first in the key memory 46 on the mobile device 12.

Figure 3:
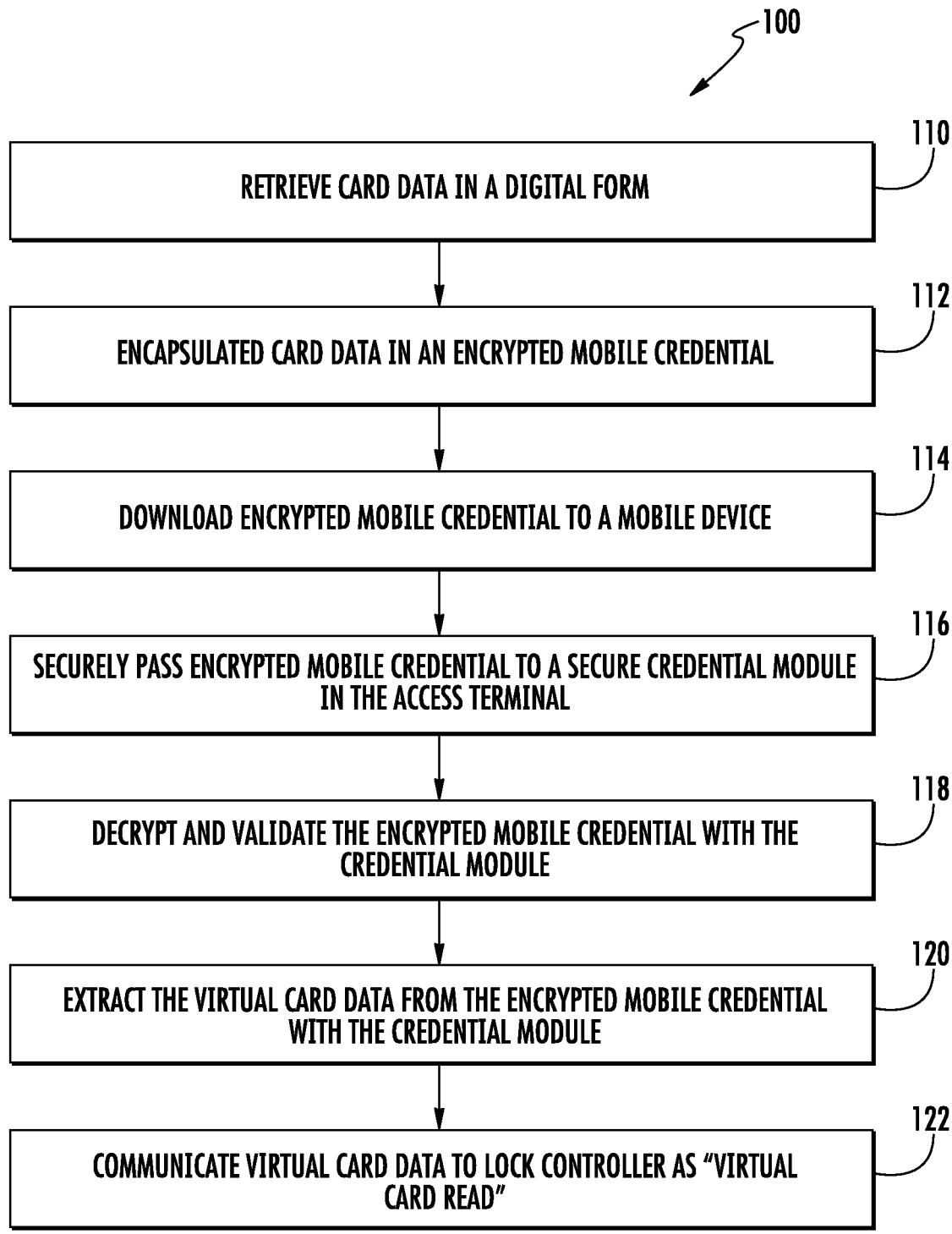
FIG. 3 is a flowchart of a credential management method performed by the user authentication system.

With reference to FIG. 3, a method 100 to facilitate communication of a credential representative of data that would normally be physically encoded on the key card 92 is retrieved in a digital form (step 110), encapsulated in an encrypted credential (step 112), downloaded to the mobile device 12 (step 114), securely passed to the credential module 36 (step 116) that decrypts and validates the credential (step 118), extracts the virtual card data (step 120), then passes the virtual card data into the lock controller 24 as a "virtual card read" (step 122). This, for example, permits a user to bypass a front desk of a hotel and go directly to their room as will be further described. The encrypted credential may be generated by the server 14 using well known techniques for digital certificate creation and encryption using cryptographic algorithms such as AES, ECC, RSA, and the like. For example, the credential may contain but is not limited to including a credential identifier, a parameter indicating the type or format of the credential, it may contain encrypted data such as the virtual card data, and it may contain a digital signature. The encrypted data may be encrypted with an AES-128 encryption key that can be known to the credential module 36. Or it may be encrypted with a derived encryption key that can be determined from information contained in the credential. Further, the digital signature may be a CBC-MAC type signature based on an AES-128 encryption key, for example, that can be known by the credential module 36. Or, it could be a digital signature based on a private key known to the server 14 and can be validated by a public key known to the credential module 36.

Figure 4:
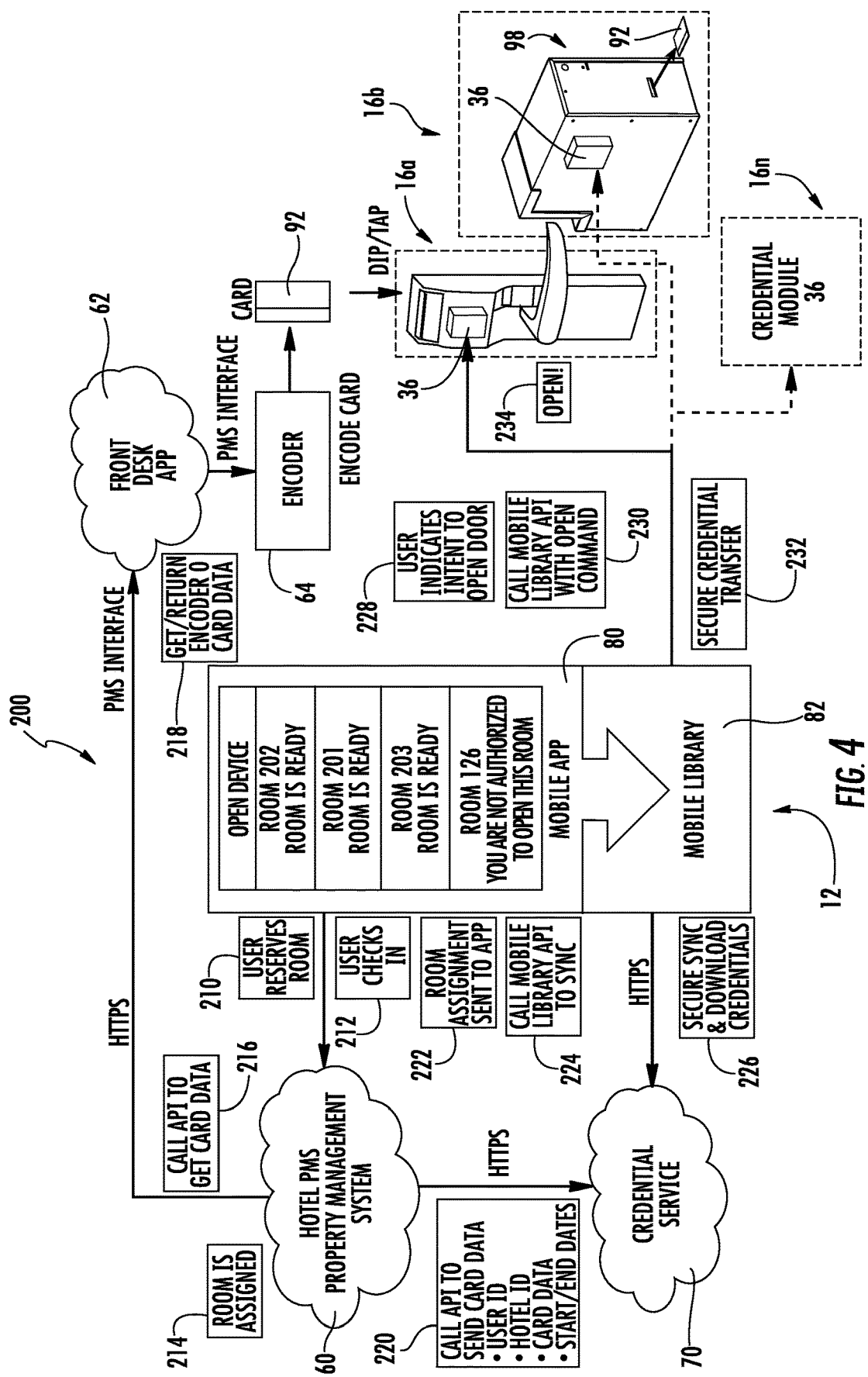
FIG. 4 is a flowchart of a credential management method performed by the user authentication system according to one disclosed non-limiting embodiment.

With reference to FIG. 4, one example bypass the front desk method 200, is initiated by a user who first reserves a hotel room (step 210) through any process supported by a hotel, such as mobile reservations, web sites, travel agents, etc. Later, a check-in procedure confirms their stay (step 212). Again, this can be performed through any process supported by the hotel.

Next, a room is assigned in a hotel property management system 60 based on the guest preferences (or room selection) and the room availability on check-in (step 214). The hotel property management system 60 may use a software-to-software application programming interface (API) provided by a front desk application 62 to request card data in a digital form (step 216). The front desk application 62 may range from a stand-alone encoder 64 to a complete software package running in a cloud that is operable to encode a virtual card for the room that was selected and return the virtual card data back to the hotel system (step 218).

Next, the hotel property management system 60 will make another software-to-software API call to a credential service 70 after the hotel system has authenticated the user and has allocated a room stay reservation (step 220). The pertinent information is communicated to the credential service 70 with an indication to include, for example, what hotel property, what room, what guest (e.g. User ID), what dates and also the virtual card data for the stay.

Simultaneous, or in sequence with sending the virtual card data to the credential service 70, the hotel property management service 60 communicates an indication to the user (again, through any conventional method) that the check-in is confirmed and the room is assigned (step 222).

Next, a mobile device 12 based hotel loyalty mobile application 80 will utilize a software-to-software API in a mobile library 82 (step 224) to download credentials from the credential service 70 (step 226). The mobile library 82 will securely authenticate to the credential service 70 with a prior established shared secret that may change on every successful connection.

Once authenticated, the credential service 70 generates at the time of the communication from the mobile library 82 the credentials for the user and encrypts into the credentials the virtual card data received in step 220 for the guest associated with this instance of the mobile library. One credential is generated for each door or access point and the virtual card data will be the same in each of these separate credentials, but may be encrypted with a unique key for the particular door or access point. The method of encryption may be AES, 3DES, or other such encryption method. The method and type of credential used may be a compressed digital certificate or a standard based certificate like X.509 or other certificate format known to the art. That is, for example, the virtual card data is encrypted into the credential with a unique key known by the credential module 36 and by the credential service 70.

The mobile library 82 will download and store the list of credentials on the mobile device 12 using native OS protections and additional encryption of data with device specific information, e.g., UDID, IMEI, IMSI, MAC addresses, etc. Now that the check-in is complete and the encrypted mobile credential (with virtual card data) is resident on the mobile device 12 (FIG. 2), the user can operate the access control 16 in an offline mode at any later time without the mobile device 12 being required to be connected to the credential service 70. Additional embodiments may have the mobile device 12 download a credential at the same time mobile device is communicating to access control 16 at the same time the user wishes to access their room, for example.

When the user wishes to access their room (step 228), the user indicates such intent through a gesture, a click of a button, a tap on the screen, a finger print read, password, proximity to the lock, touching the lock, etc. In response to this, intent, the hotel loyalty mobile application 80 again calls the software-to-software API in the mobile library 82 to initiate the secure transfer of the encrypted mobile credential to the access control 16 (step 230). While the loyalty application 80 initiates the transfer, the mobile library implements the secure transfer separately in the next step.

Secure transfer of the credential (step 232) may start with a process of the mobile library 82 listening for a signal advertisement such as Bluetooth low energy (BTLE) advertisements from in-range access controls 16. That is, the access controls 16 are advertising their presence on a periodic rate with advertisement data that indicates an identifier of the access control 16 and the mobile device 12 can listen and connect automatically without the person having to push a button to wake-up a sleeping, battery powered lock 16 or to get out of a vehicle to interact with a reader access point on a garage door or other device. The reader access point is another type of lock 16. Another embodiment is to use Near Field Communication (NFC) and the person 'taps' their mobile device to the lock 16 and a secure credential exchange transfers the mobile credential to the access control 16 (step 232). Secure credential exchanges can be done using standard techniques such as establishing a session key, encrypting communication messages, and validating the authenticity of message sender and receiver.

In the preferred embodiment where the access control advertises using Bluetooth low energy (BTLE), the mobile library 82 filters the received advertisements based on the received identifier of the access control 16 and by comparing with identifiers contained in or associated with each credential in the list of mobile credentials and based on the user intent to access a particular room. Once an advertisement is received for a target access control 16, the mobile library 82 initiates a wireless connection, and performs a secure transfer of the encrypted mobile credential (step 232). The secure transfer may utilize a unique session encryption key and standard cryptographic algorithms and techniques. It should be appreciated that the data can be securely transmitted over any wireless link, to include but not be limited to BTLE, zigbee, Near Field Communication, etc.

The credential module 36 will receive the encrypted mobile credential, then validate and decrypt the encrypted mobile credential to retrieve the virtual card data. The decryption and validation may include, but not be limited to, validating a digital signature, validating the type of the credential, validating that the credential identifier matches an identifier in the lock memory 32, validating a starting date and an expiring date of the credential, validating the source of the credential, etc. (step 118; FIG. 3). Once validated and decrypted, the virtual card data is extracted (step 120; FIG. 3).

The virtual card data is then communicated via hardware and software interfaces, depending on embodiments, to the lock controller 24 which may further decrypt the virtual card data, processes the data based on lock vendor rules, then open the lock if entry is permitted (step 234). Notably, the virtual card data is communicated into the lock controller 24 as a "virtual card read" in a data format equivalent to that of a physical key card. This thus permits the continued usage of traditional guest key cards 92 such as that of a family member, or a guest that just wants a copy of the physical key card 92, along with usage of the mobile device 12.

The audit trail uploaded by the mobile device 12 can be just the audits generated by the mobile device 12 itself, or can be the unified audits including openings by the guest using a physical key card. In addition, when the lock 16 is opened, a battery status or other maintenance information thereof may be uploaded into the audit trail from the mobile device 12 to the credential service 70 so that the hotel can be notified of low battery conditions and proactively change the batteries, or perform other maintenance. Other information associated with the audit trail can include, for example, failed openings or failed attempts or credentials that failed validation.

Usage of the "virtual card read" maintains a contiguous audit trail and also maintains all the known use cases for access control that are already encoded into traditional card data. Furthermore, the credential module 36 is lock vendor agnostic, so that any lock vendor's data could be passed through to allow each lock vendor to independently innovate card data. Further, the credential module 36 may be supplied by a different company than the lock 16. And also, the server 14, mobile device 12, and credential module 36 may have no means for further decrypting or validating the card data other than treating it like a data object to be encoded, encrypted, transferred, retrieved and delivered. Additionally, the "virtual card read" can be used offline without requiring the mobile device 12 to be online with a Wi-Fi connection or real time connection to a credential service. That is, the data for the "virtual card read" is stored on the mobile device 12 and passed securely to the credential module 36 in an offline mode. This is not to limit the capability to also send the "virtual card read" in an online mode. An additional benefit is that any access controls 16 can use any card types in addition to using a credential module 36, where the card types include but are not be limited to, Magnetic strip, RFID, Proximity, etc.

In another disclosed non-limiting embodiment, the credential module 36 can be used for many purposes, to include, but not be limited to, passing data to a self-service hard-key dispenser unit 98 that produces physical key cards 92. The hard-key dispenser unit 98 has a credential module 36 that receives the virtual card data, decrypts, extracts and sends to a lock controller 24 configured to encode the data onto a physical key card 92. That is, the virtual card data on the mobile device 12 is written to a physical key card 92 by the unit 98 and dispenses the key card 92 in an automated manner. The unit 98 does not require any user interface besides the dispensing element for the key card 92 and a unit power source, including but not limited to batteries, mains power, energy harvesting, and the like. The user interface for the unit 98 is really the interface of the mobile device 12. When the unit 98 begins to run low on blank key cards 92, the mobile device 12 can upload to the credential server 70 an indication of the status that can be turned into a report to notify the hotel that the unit 98 needs to be refilled.

In other disclosed non-limiting embodiments, the virtual card data can be standard access control card data (i.e. identification data) for badge access systems, or integrated into a vending machine with the virtual card data as credit card information, tokens, purchase reference identifiers, or the like.

Figure 5:
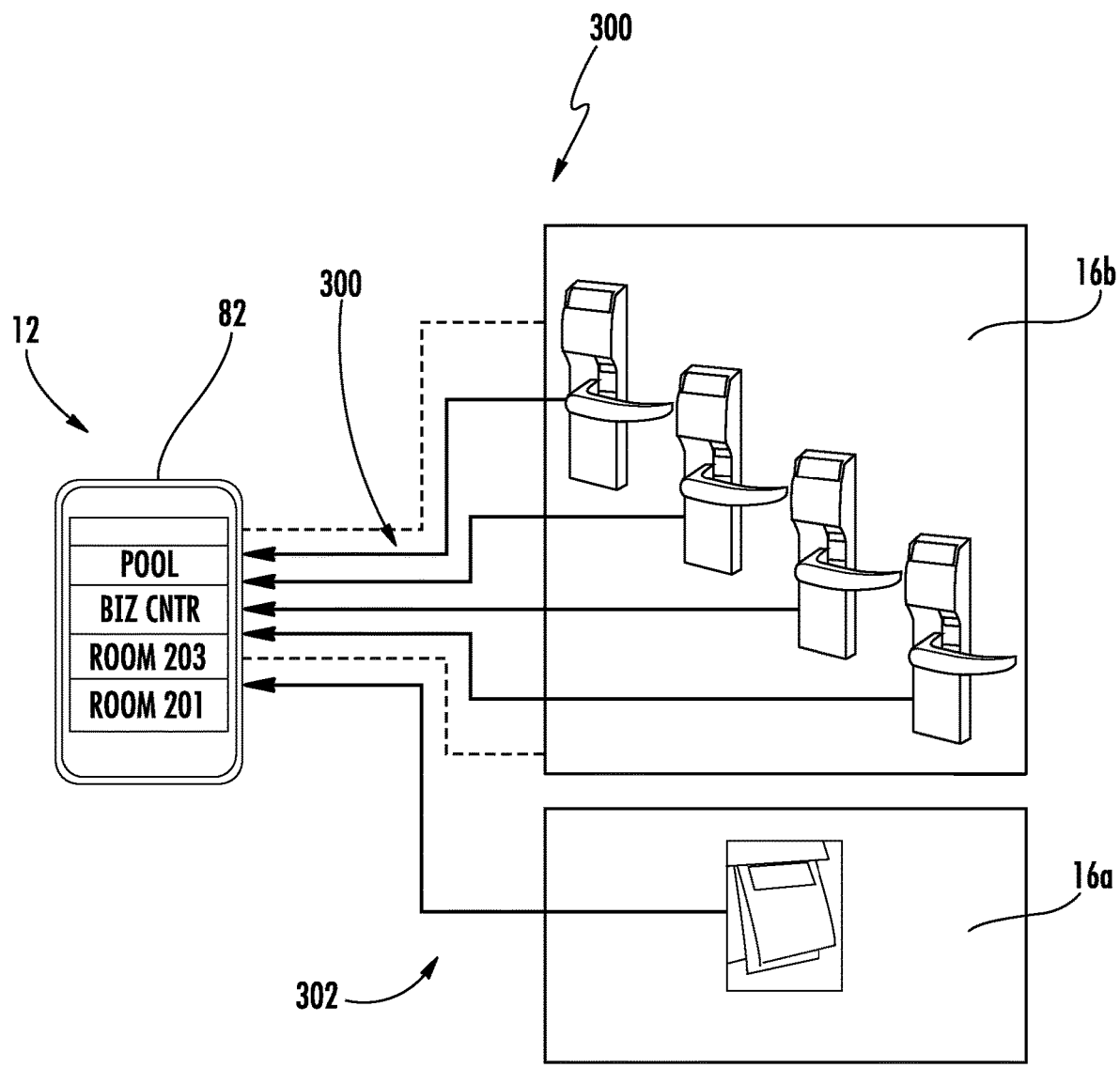
FIG. 5 is a schematic view of a credential according to another disclosed non-limiting embodiment.

With reference to FIG. 5, the mobile library 82 may include a set of mobile credentials that were generated by the credential service 70 based on access categories 300 (implicit permission) in addition to the mobile credential with virtual card data (explicit permission) 302 that was generated by the credential service 70 for a specific access control 16a. The access categories 300 operate to grant the user access to a particular grouping of access controls 16b that have collective meaning. For example, one access category could be 'Public Rooms' for access to a pool, business center, elevator, and wall readers. In the context of a hotel reservation, when the mobile device 12 communicates with the credential service 70 to download the encrypted mobile credential, the credential service 70 generates credentials for each lock in one or more access categories that the guest has been granted access. The encrypted mobile credential will thus have the same virtual card data encoded specifically for each specified access point, e.g., pool, business center, etc. and may optionally have the access category downloaded in or with the credential. However each mobile credential will be encrypted separately with a unique key for each access control 16b.

Provision and use of the access category 300 by the credential service 70 facilitates the efficient management of multiple access controls 16b in a system where the mobile device 12 can open multiples of locks where the mobile device 12 has a specific credential for each lock. This is simpler when compared to that which is conventionally required, e.g., two access control systems—one for the hotel system that generates the virtual card data with all the current art for hotel system access business rules, and a second one for granting access with a mobile credential to each access point, e.g., guest room, wall readers, pool, business lounge, etc. In other words, the business rules for the hotel system would need to be duplicated in the credential service.

The access category 300 allows for multi-vendor integration and can work separately from the hotel system access business rules that get encoded into virtual card data. The mobile credentials are thus an additional 'layer' of security "on top" of the virtual card data. The access category 300 also allows for relatively more simple maintenance procedures, such as, for example, when a lock in the 'Public' Access Category is replaced, the replacement lock need only be assigned to the same access category. However, a mobile device 12 would still need to communicate again to the credential service 70 for a new set of mobile credentials to be downloaded. No further administration is required on the part of the guest or system besides including the replacement lock in the correct access category and all guest permissions will continue to work seamlessly without modification even though the new lock has unique encryption keys from the prior lock.

Figure 6:
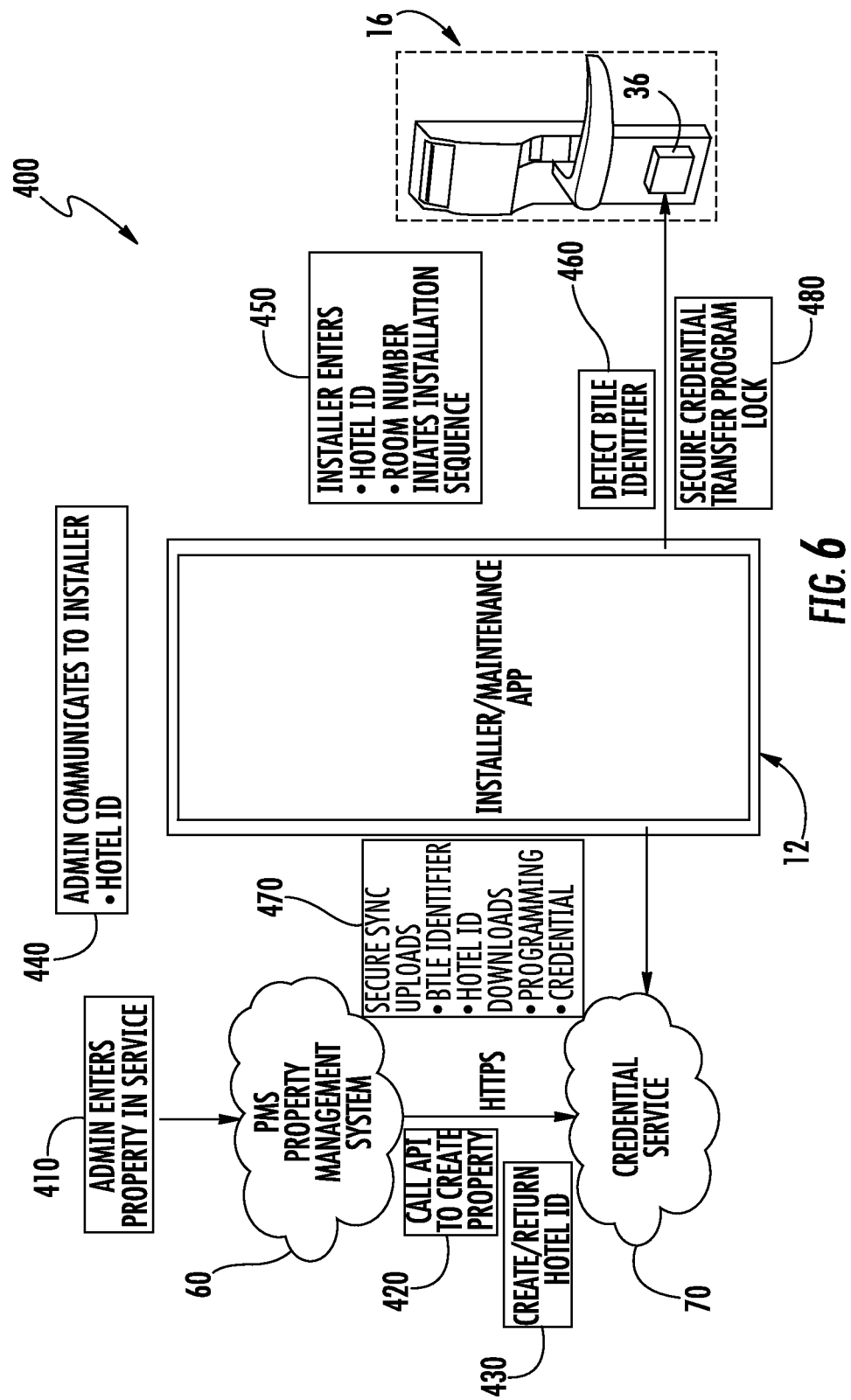
FIG. 6 is a schematic view of a lock initialization method according to another disclosed non-limiting embodiment.

With reference to FIG. 6, in another disclosed non-limiting embodiment, a lock initialization method 400 is initiated by an administrator who enters a lock initialization request into the hotel property management system 60, e.g., to set a lock encryption key, or a lock update request, e.g., to roll the lock encryption key, into the hotel property management system 60. It should be appreciated that the method 300 is not limited to hotels, and can be readily extended to various access control systems.

Initially, an administrator creates or enters a new property into the hotel property management system 60 (step 410). Part of this property creation process includes the hotel system 60 calling a software-to-software application programming interface (API) to allocate or retrieve an associated hotel ID in the credential service 70 that can serve to link the credential service 70 hotel ID to the hotel property management system 60 property ID (step 420). The credential service 70 allocates or creates the link between the property ID and the Hotel ID (step 430). Thus, the Hotel ID and the property ID can be used interchangeably in this description as either the credential service 70 or the Hotel Property management System 60 can retrieve the association and determine the one from the other. In one embodiment, an administrator can communicate this hotel ID to an installer who can enter the hotel ID into an application on the mobile device 12 (step 440). An alternate embodiment is to download the Hotel ID associated with the installer's account after the application on the mobile device 12 authenticates to the credential service 70.

Next, the installer associates the credential module 36, and by association the lock 16 and by association a serial number of the credential module 36 with the associated Hotel ID in the credential service 70 (step 450). Additionally, the serial number can be specifically assigned to a room or access category as described above. Such assignment may be performed by detection of the serial number via a scan of a QR code, from actively detecting the BTLE signal when the lock 16 is in a particular mode and the BTLE advertisement characteristic reflects the mode to distinguish one lock 16 from another, and/or by reading from or scanning a label on the lock 16 or credential module 36 (step 460). Alternatively, the serial number is generated in the credential module 36 or lock 16 at the time of installation. In all cases, the application on the mobile device 12 gets the serial number of the lock 16 and credential module 36 and assignment to the Hotel ID and uploads to the credential service 70 (step 470).

Now, the credential service 70 has pertinent information, e.g., serial number and hotel property ID in this example, to create an encrypted programming credential in real time and to download in the same session when the assignment was uploaded (step 470). The encrypted programming credential contains programming data to program the encryption key of the specific lock, e.g., specific AES-128 key for the property, MiFare Plus encryption keys specific to the property, and/or an RSA/ECC encryption key for trusted authority validation. The particular encryption key that is in the programming credential may be associated with the particular Hotel ID. Or, it may be randomly assigned. Or, the encryption key may be pre-configured to be loaded to this device serial number. The above example has the assignment of the lock 16 to the Hotel ID being uploaded by a mobile device 12 to the credential service 70. An alternate embodiment is to pre-configure the association of the lock 16 to the Hotel ID through a separate interface in the Hotel property management system 60 which could use the software API to communicate the association to the credential service 70.

Now, the programming credential is encrypted and contains the new encryption key for the credential module 36 and is downloaded to a mobile application on the mobile device 12. In one embodiment, the mobile application is the same installer application used to detect the lock serial number when in proximity to the lock. Or, the application may be a separate mobile application used by hotel maintenance staff, or a hotel guest mobile phone application such as that described above.

As discussed above, once the appropriate BTLE advertisement is received (step 460), the installer mobile application initiates a wireless connection with the lock, and performs a secure transfer of the encrypted programming credential (step 480). Additionally, as part of this step, the credential module 36 will receive the encrypted programming credential, then decrypt and validate the encrypted programming credential to retrieve the programming data. Once validated and decrypted, the programming data is extracted and the credential module 36 and lock 16 is initialized thereby (step 480).

While the above description describes a BTLE exchange, presenting the encrypted programming credential to the lock may be performed via a secure peer-peer wireless communication session between the mobile device and the lock by various communication protocols, i.e. Bluetooth, BTLE, IrDA, Wi-Fi, Wi-Fi Direct, NFC Peer-Peer, NFC Reader/Writer, etc., or by presenting the programming credential as a virtual MiFare card using Host Card Emulation (HCE) with a NFC enabled smart phone. Additionally, while the preferred embodiment has the programming credential presented to the lock 16 over an authenticated and encrypted communication means, the programming credential is constructed in an encrypted form and it can be presented to the lock without an encrypted or authenticated link without compromising the security of the programming credential. The credential module 36 is capable of determining the validity of the programming credential independently from the means of passing the credential to the lock.

Once the lock is programmed, the maintenance person can use a mobile application to further authenticate the lock and configure lock parameters, such as real time clock time, BTLE transmit power, BTLE advertisement rate, etc. Further, the encryption keys in a lock 16 can be rolled on a periodic basis where additional encrypted programming credentials are created and delivered to mobile applications on a mobile device 12 to update the lock. This rolling can be done by using a technician to communicate to each and every lock in a hotel, for example, or the programming credentials can be downloaded to guest phones 12 without their required awareness and their normal activity of opening a lock 16 would present the programming credential and thus roll the key.

Figure 7:
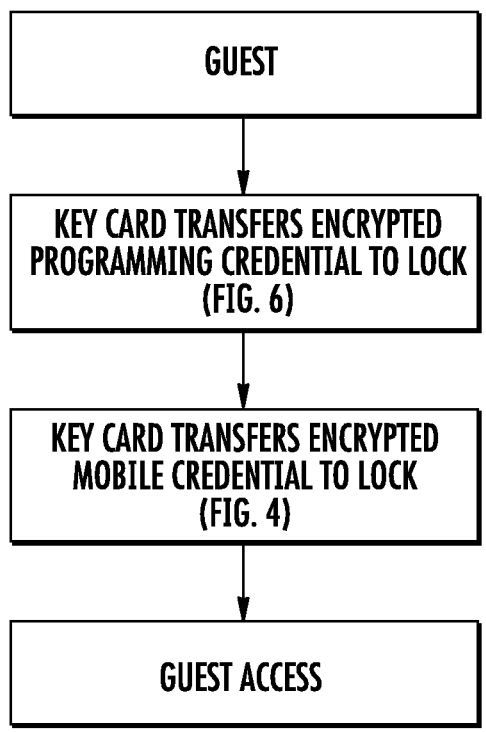
FIG. 7 is a schematic view of a lock initialization method according to another disclosed non-limiting embodiment.

With reference to FIG. 7, in another disclosed non-limiting embodiment, the key card 92 may be utilized to transfer the encrypted programming credential to configure the lock. That is, a hotel guest communicates the encrypted programming credential via the key card 92. In this embodiment, the guest, who is to be the first person to attempt to access the lock 16, communicates the encrypted programming credential to configure the lock, then the regular card data (FIG. 4) to operate the access control 16. The lock reads the key card, processes the encrypted programming credential first, and then reads the rest of the key card data for subsequent processing. It should be appreciated that there are various ways to implement this on the key card such as by separate sectors, separate data elements, and/or multi-application smart card. A standard hotel card encoder that is updated to encode the remote programming data on the key card can create this physical embodiment.

Alternatively, rather than the guest, the key card 92 may be that used by maintenance or cleaning staff as a 'master card' or it could be a normal guest card. In either case, the encrypted programming credential is stored on the key card alone, or in addition, to the mobile credential with virtual card data that is stored on the key card. The method 400 thereby permits configuration of the locks without requiring that a maintenance person physically visit each specific lock and the lock need not be pre-programmed for a hotel. Also, specific programming procedures for each lock in a hotel need not be established as hotel or lock specific encryption keys are not required as the guest, hotel cleaning staff, etc., can configure the lock transparently with other 'normal' interactions with the lock.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. An access control system, comprising:
a credential service operable to generate an encrypted programming credential;
an installer mobile application on a mobile device operable to communicate with the credential service, the installer mobile application operable to receive and download the encrypted programming credential from the credential service, and wherein the installer mobile application also receives and downloads an encrypted mobile credential; and
a credential module for an access control, the credential module being in the access control and operable to decrypt and extract programming data from the encrypted programming credential, wherein the installer mobile application is configured to wirelessly send the encrypted programming credential to the credential module, the programming data usable to program the access control and operable to set a lock encryption key or roll a lock encryption key, and wherein the installer mobile application is configured to communicate the encrypted mobile credential to the credential module in an access control subsequent to communicating the programming data from the credential module to program the access control, wherein the programming data is identical to a card meta-data physically encoded on a physical key card, whereby the programming data can be from a multiple of different vendors whereby the credential module is lock vendor agnostic.

2. The system as recited in claim 1, wherein the credential module is operable to validate the encrypted programming credential.

3. The system as recited in claim 1, wherein the mobile device includes a smartphone.

4. The system as recited in claim 3, wherein the access control is a lock.

5. The system as recited in claim 1, wherein the mobile device includes a mobile application used by hotel maintenance.

6. The system as recited in claim 5, wherein the access control is a lock.

7. The system as recited in claim 1, wherein the mobile device includes a key card.

8. The system as recited in claim 7, wherein the access control is a lock.

9. The access control system as recited in claim 1, wherein the credential module is a component of the access control.

10. The access control system as recited in claim 1, wherein the mobile device is configured to send the encrypted programming credential to the credential module unmodified and as received from the credential service.

11. A method of managing encryption for a mobile device, the method comprising:
downloading an encrypted programming credential to a mobile device;
wirelessly communicating the encrypted programming credential to a credential module in an access control;
decrypting and validating the encrypted programming credential;
extracting programming data from the encrypted programming credential at the access control, wherein the programming data is identical to a card meta-data physically encoded on a physical key card; and
communicating the programming data from the credential module to program the access control, and to set a lock encryption key or to roll a lock encryption key in response to the programming data, whereby the programming data can be from a multiple of different vendors whereby the credential module is lock vendor agnostic.

12. The method as recited in claim 11, wherein downloading the encrypted programming credential to the mobile device includes downloading the encrypted programming credential to a smart phone.

13. The method as recited in claim 11, wherein downloading the encrypted programming credential to the mobile device includes downloading the encrypted programming credential to the key card.

14. The method as recited in claim 11, wherein the credential module is a component of the access control.

15. The method as recited in claim 11, wherein the mobile device is configured to send the encrypted programming credential to the credential module unmodified and as received from the credential service.

16. A method of managing credentials for a mobile device to program and access an access control of a hotel, the method comprising:
downloading an encrypted programming credential and an encrypted mobile credential to a mobile device of a hotel guest;
wirelessly communicating the encrypted programming credential to a credential module in an access control;
decrypting and validating the encrypted programming credential at the credential module;
extracting programming data from the encrypted programming credential at the credential module;
communicating the programming data from the credential module to program the access control wherein the programming data is identical to a card meta-data physically encoded on a physical key card;
communicating the encrypted mobile credential to the credential module in the access control subsequent to communicating the programming data from the credential module to program the access control, wherein the programming data contains instructions to set a lock encryption key or to roll a lock encryption key;
decrypting and validating the encrypted mobile credential at the access control;
extracting virtual card data from the encrypted mobile credential; and
communicating the virtual card data from the credential module to operate the access control as a "virtual card read".

17. The method as recited in claim 16, wherein the encrypted mobile credential includes an access category in addition to a mobile credential with the virtual card data for a specific access control.

18. The method as recited in claim 16, wherein the credential module is a component of the access control.

19. The method as recited in claim 16, wherein the mobile device is configured to send the encrypted programming credential to the credential module unmodified and as received from the credential service.

20. The method according to claim 16, wherein the "virtual card read" maintains a contiguous audit trail and also maintains all known use cases for the access control that are already encoded into traditional card data.

* * * * *